United States Patent [19]
Genack et al.

[11] Patent Number: 6,012,339
[45] Date of Patent: *Jan. 11, 2000

[54] TANGENTIAL ROTOR FLOW RATE METER

[75] Inventors: Thomas Genack, Milwaukee, Wis.; William W. Roeber, Naperville, Ill.

[73] Assignee: Lake Monitors, Inc., Milwaukee, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/829,306

[22] Filed: Mar. 31, 1997

[51] Int. Cl.$^7$ .............................. G01F 15/00; G01F 1/07
[52] U.S. Cl. .................................... 73/861.77; 73/861.88
[58] Field of Search .......................... 73/861.77, 861.78, 73/861.79, 861.87, 861.88

[56] References Cited

U.S. PATENT DOCUMENTS

| | | |
|---|---|---|
| 2,782,638 | 2/1957 | Von Arx . |
| 2,915,606 | 12/1959 | Knauth . |
| 2,988,916 | 6/1961 | Waugh . |
| 3,433,065 | 3/1969 | Mergler . |
| 3,665,764 | 5/1972 | Roberts .................................. 73/231 |
| 3,756,077 | 9/1973 | Milovancevic ............................ 21/10 |
| 4,140,013 | 2/1979 | Hunger ..................................... 73/229 |
| 4,509,805 | 4/1985 | Baird et al. .......................... 73/861.77 |
| 4,825,708 | 5/1989 | Sevick .................................. 73/861.77 |
| 4,848,164 | 7/1989 | Quarve et al. ........................ 73/861.77 |
| 4,872,352 | 10/1989 | Alden et al. .......................... 73/861.77 |
| 4,885,943 | 12/1989 | Tootell et al. ....................... 73/861.77 |
| 5,259,251 | 11/1993 | Brinster et al. ...................... 73/861.77 |
| 5,325,715 | 7/1994 | Foran et al. ......................... 73/861.77 |
| 5,392,655 | 2/1995 | Palmer et al. ....................... 73/861.77 |

OTHER PUBLICATIONS

Brochure entitled "It's A Fact!" by Lake Monitors, Inc. (published Apr. 1996).

Declaration re. Experimental Use, by Thomas Genack (1997).

*Primary Examiner*—Harshad Patel
*Attorney, Agent, or Firm*—Godfrey & Kahn, S.C

[57] ABSTRACT

A flow meter is provided that can be used to measure the flow of fluids from a fluid source to a receiving system, and methods of using the flow meter to measure fluid flow. The flow meter is composed of a housing that contains a fluid flow sensing member in the form of a rotatable bladed rotor or turbine in one chamber and a sensor and a signal-conditioning circuit in a second separate chamber. The rotor rotates by fluid flow through the housing chamber. The rotor preferably contains a magnet that passes over a magnetically-operated sensor and triggers it to produce a signal that is processed by the conditioning circuit into a 4–20 mA output signal that indicates a range from no flow to full flow of the liquid through the flow meter.

23 Claims, 7 Drawing Sheets

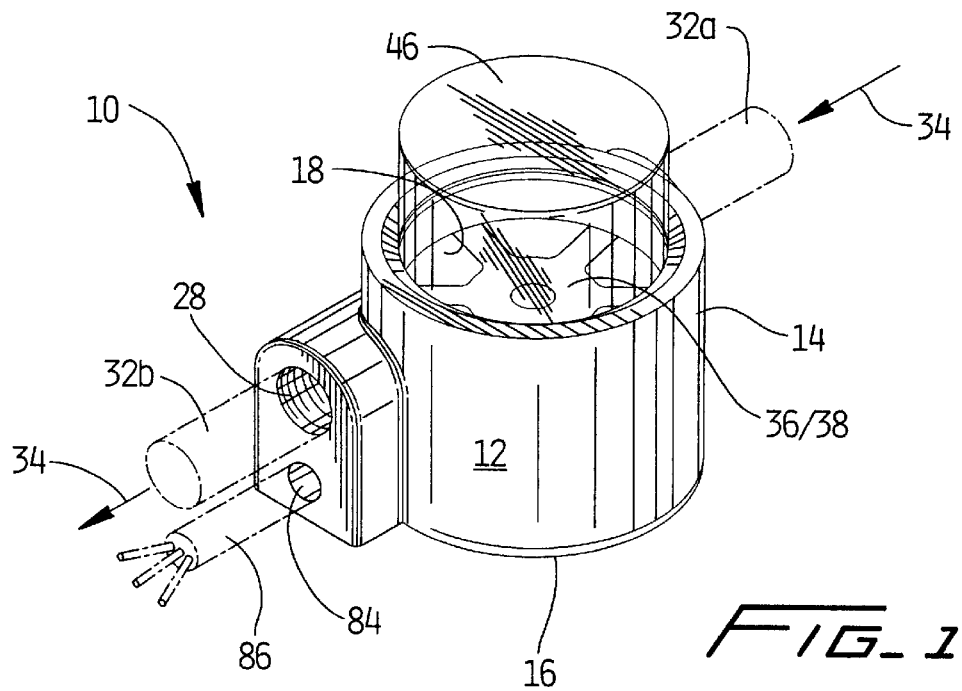
FIG_1
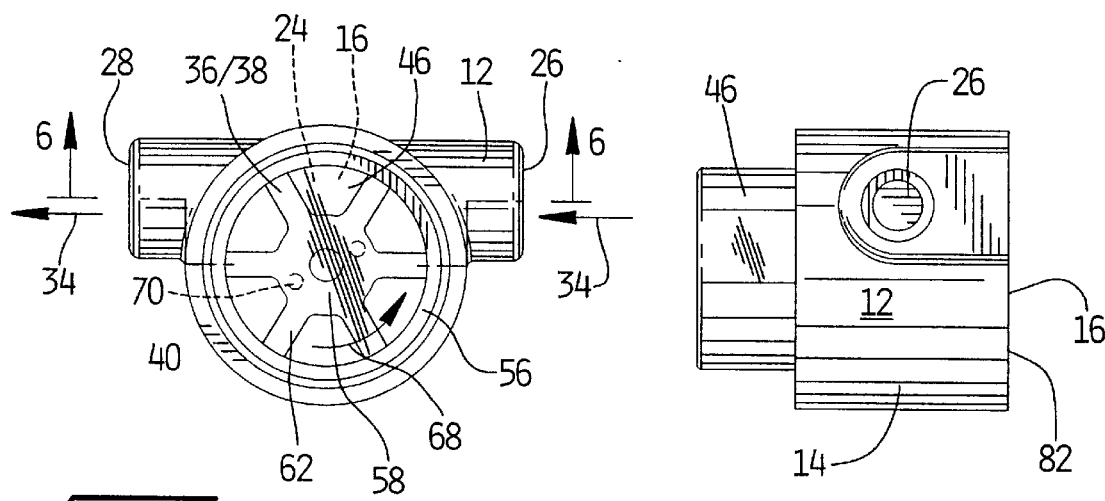
FIG_3
FIG_4
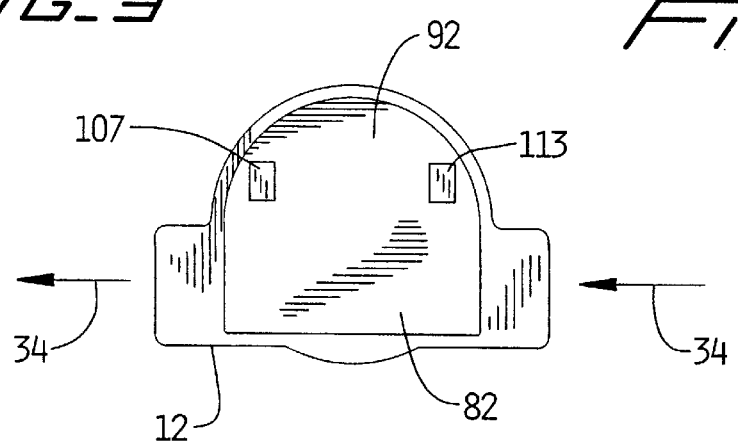
FIG_5

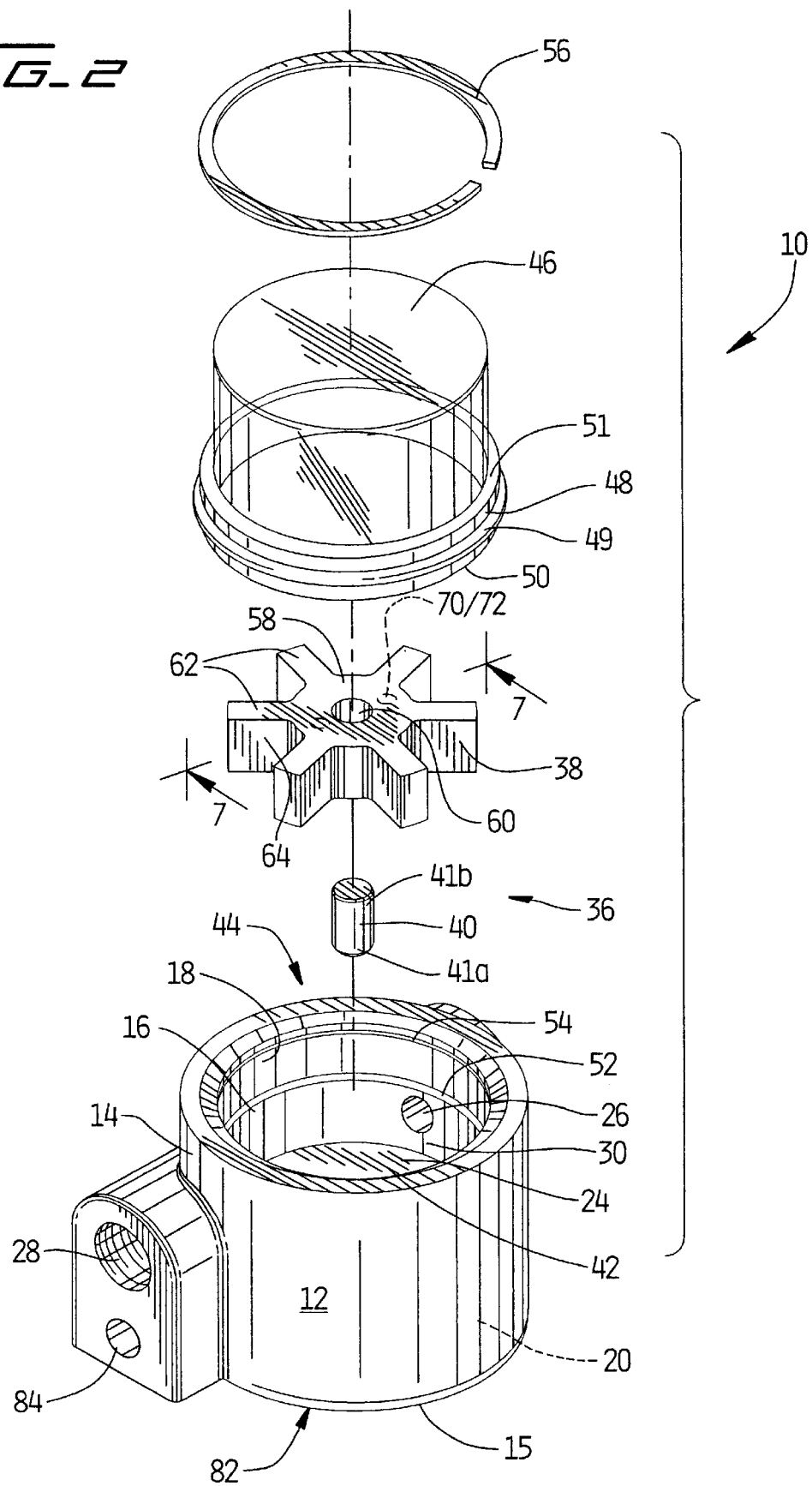
FIG_2

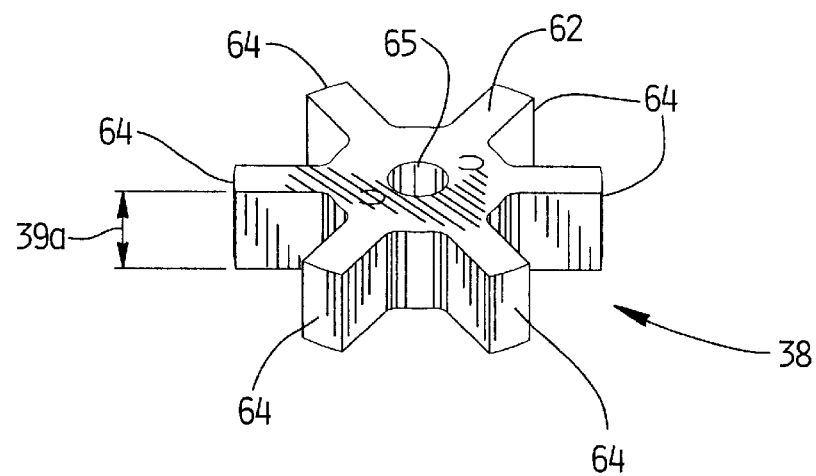
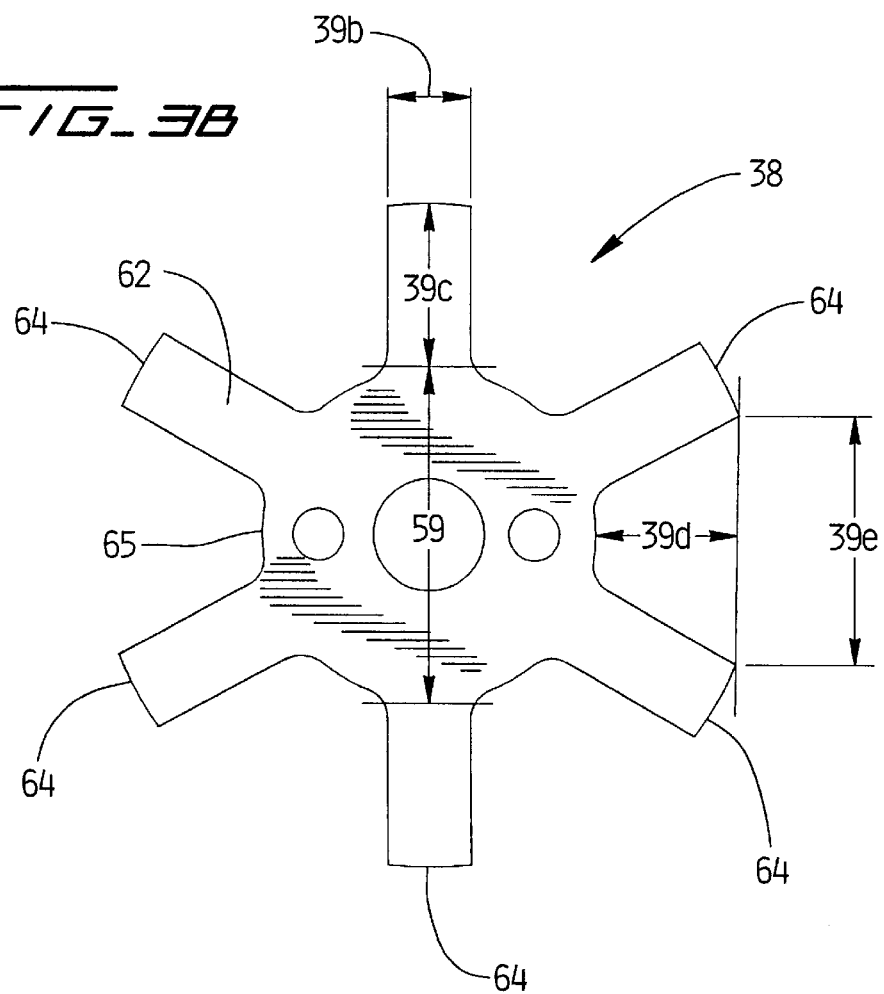

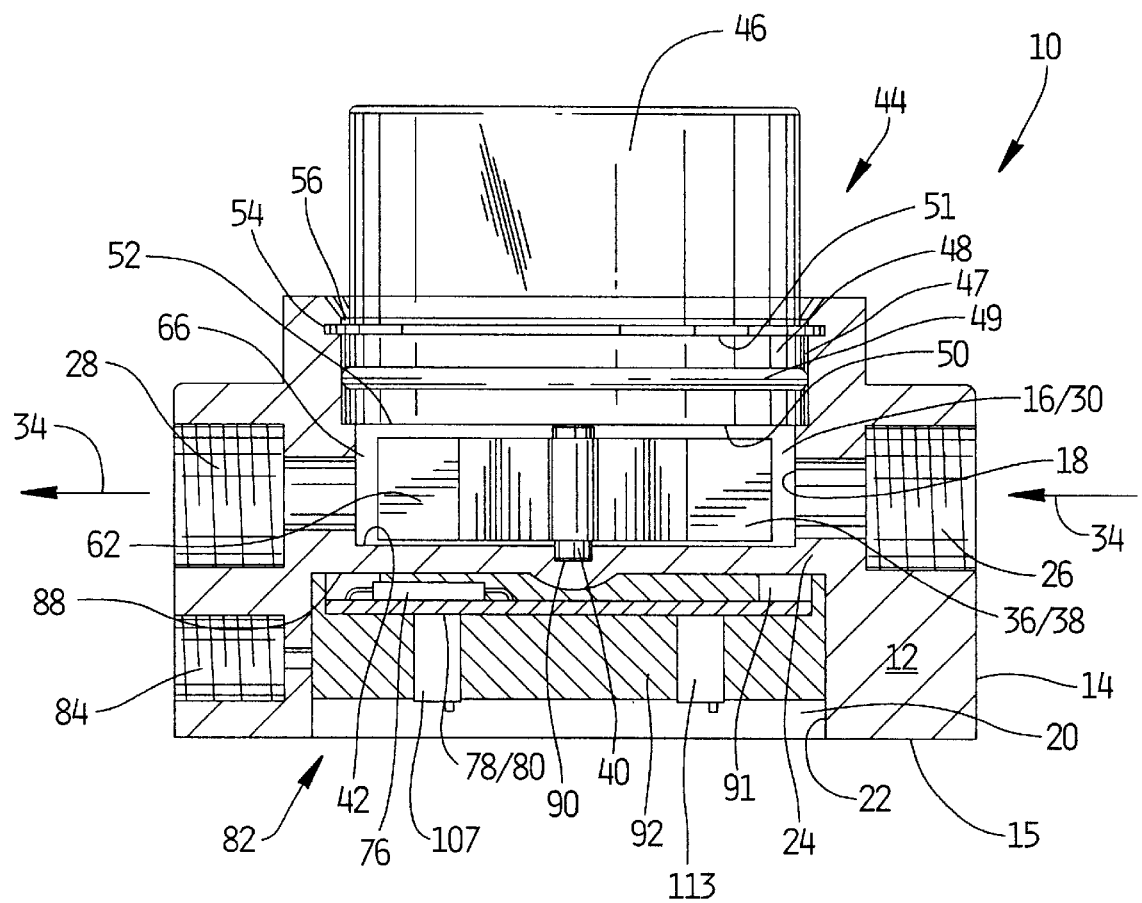
FIG_6
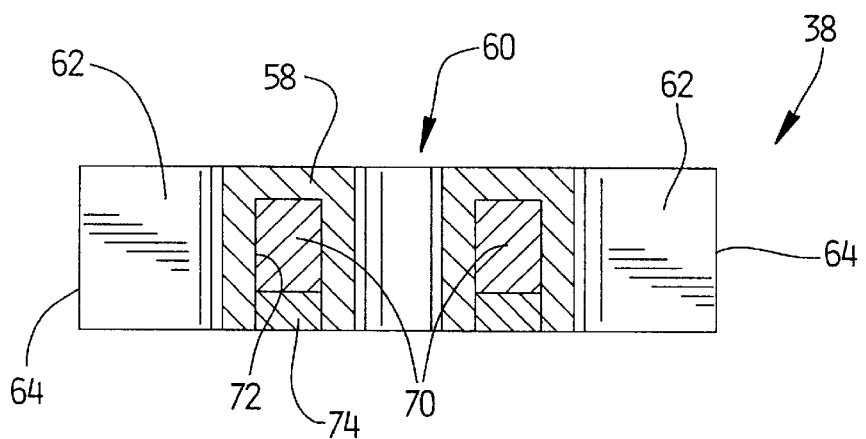
FIG_7

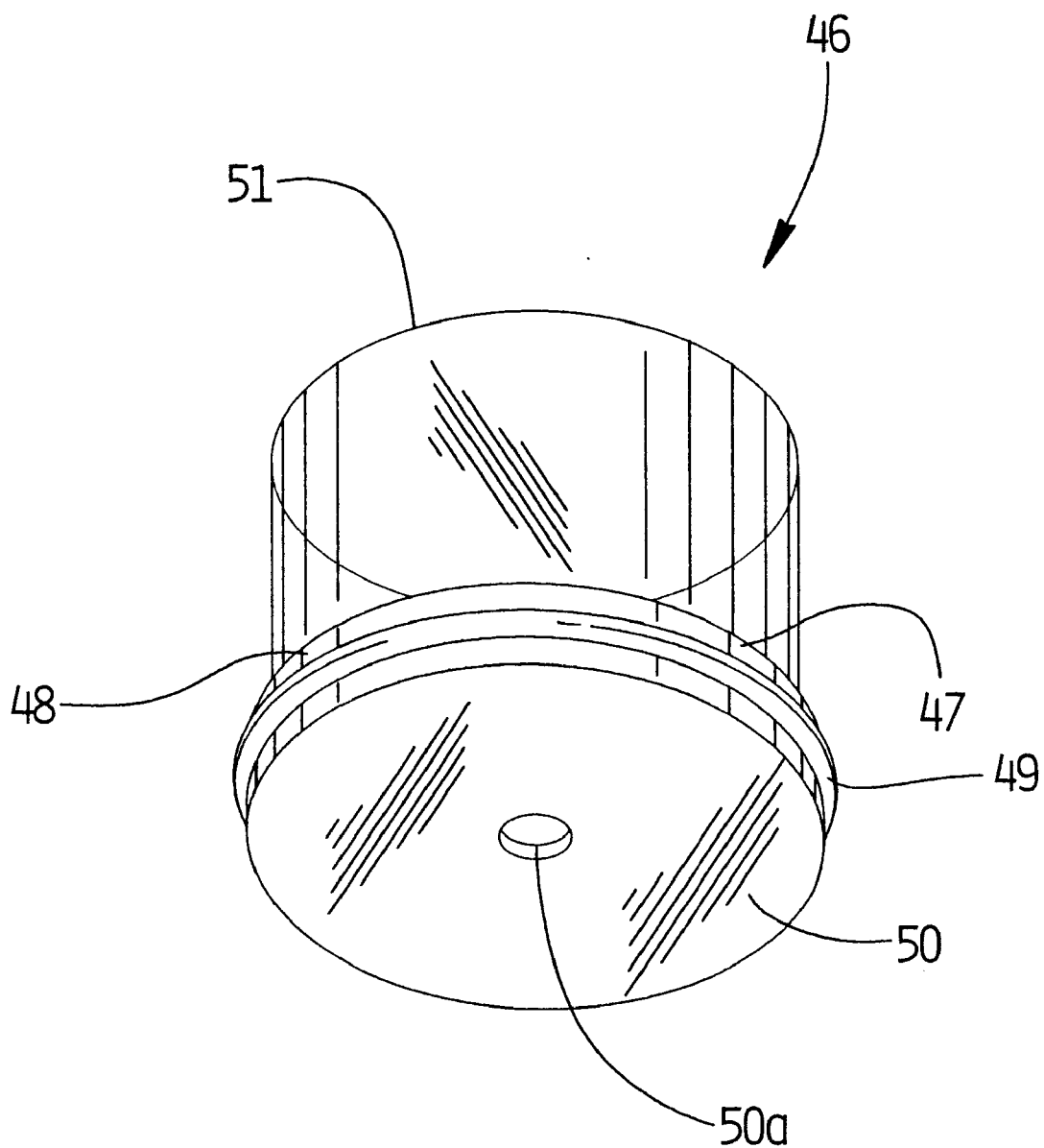

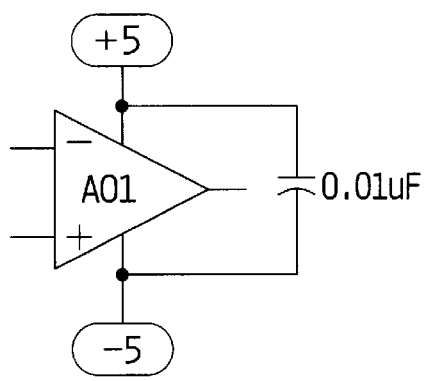
FIG_9A
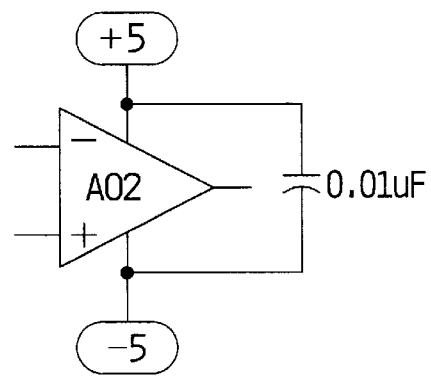
FIG_9B
FIG_10
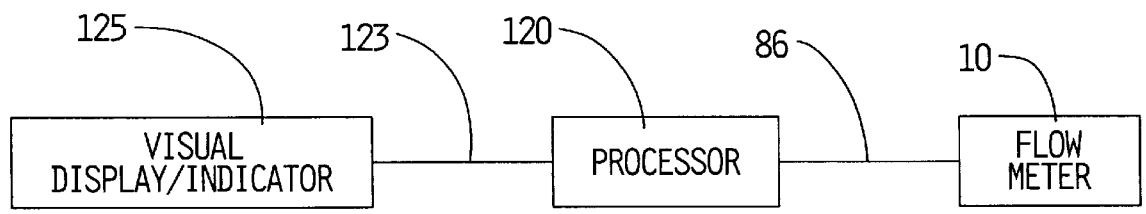

TANGENTIAL ROTOR FLOW RATE METER

BACKGROUND OF THE INVENTION

1. Field of the Invention

The present invention relates to devices used to measure the flow of a liquid, or flow meters. More particularly, the present invention relates to flow meters having a tangentially oriented rotor and a compact and relatively simple design.

2. Background of the Invention

Flow meters of various design are known in the art for measuring fluid flow. In general, flow meters are designed with an internal rotor that rotates as fluid or, more specifically, liquid passes through the meter. The turbine rotates at a rate that is related to the rate of fluid flow and a sensing mechanism in the meter measures the rotation. This measurement may then be used directly or further processed to produce an indication of the rate of fluid flow through the meter.

Examples of flow meters are found in U.S. Pat. No. 4,885,943 (Tootell), U.S. Pat. No. 4,825,708 (Sevick), U.S. Pat. No. 4,872,352 (Alden), and U.S. Pat. No. 4,140,013 (Hunger). A drawback of the systems shown in these patents is that the flow meter is housed separately from the signal processing electronics, thus requiring two distinct components that must be interconnected by a signal cable.

U.S. Pat. No. 4,848,164 (Quarve) describes a flow meter system that includes both a flow detection component and signal processing electronics. A drawback of that system is that the rotor cannot be observed by the user, and the flow meter is composed of three housing units that must be disassembled in order to gain access to the rotor. The use of separate housing units also increases the risk of external fluids and/or gases seeping into the meter through the junctures of the units.

Another drawback of conventional flow meters is their inability to provide an accurate measure of the flow rate. In particular, many flow meters will indicate a flow rate when, in fact, no fluid is flowing ("a no flow environment.")

Therefore, it is an object of the present invention to provide a flow meter that includes both the sensing mechanism and the signal conditioning circuitry in a compact single housing unit. A further object is to provide a flow meter with signal conditioning circuitry that may be directly connected to an analog processor without the need for external conditioning circuitry. Another object is to provide a unitary flow meter that allows manual access to the turbine or rotor without having to remove the sensing mechanism or the electronic circuitry from the unit. Yet another object is to provide a flow meter with a high level of durability and which is highly accurate in providing fluid flow data.

SUMMARY OF THE INVENTION

These and other objects are achieved by the present invention which is a flow meter that can be used to measure the flow of fluids from a fluid source to a receiving system, and methods of using the flow meter to measure fluid flow. The flow meter is composed of a housing having two chambers separated by a wall, with an inlet and outlet leading into a passageway through the first chamber. A member that is operable to sense the flow of a fluid through the passageway is mounted within the first chamber. The fluid flow sensing member is composed of a rotor having two or more blades and a signalling element. Preferably, the rotor is composed of six blades with two diametrically-opposed magnetic members as the signalling element embedded in the body of the rotor. The rotor is rotatably mounted on a shaft having an axis that is tangential to the fluid flow. At least a portion of the rotor extends into the passageway of the first chamber and is rotatable about the shaft by contact of fluid flowing through the passageway.

Mounted in the second chamber is a sensor element, preferably a reed switch or other magnetically-operated sensor. The sensor is mounted in proximity to the signalling element in the rotor such that the signalling element will cause the sensor to produce a signal for each rotation of the rotor.

The second chamber also houses a signal-conditioning circuit that is operable to receive the signal from the sensor and to convert the pulsed signal into an output signal. The output signal provides an indication of the flow rate of the fluid through the fluid flow passageway of the flow meter.

The flow meter is designed to function with relatively simple, linear circuitry. To that end, the rotor of the flow meter is uniquely dimensioned and shaped to provide a linear relationship between the rate of fluid flow through the flow meter and the signal output of the device.

The flow meter is designed to be incorporated into a system for measuring and controlling fluid flow. In such a system, the signal-conditioning circuit of the flow meter can be coupled in data communication with an analog processor such as a PLC, a micro-controller, an analog input card of a computer, and the like. The flow meter of the present invention is designed to be supplied with an appropriate DC voltage, such as one that would be provided by a DC power supply rated at about 12–35 V DC. The flow meter is designed to produce a signal in the range of 4–20 mA. A current level or amplitude of about 4 mA is equivalent to an about zero flow value and a current level of about 20 mA is equivalent to a predetermined maximum or fill scale flow value.

The analog processor is calibrated to a no flow value at an amplitude of about 4 mA and a predetermined maximum or full flow value at an amplitude of about 20 mA. The analog processor can be programmed to conduct a task when the signal received from the signal-conditioning circuit reaches a predetermined amplitude, for example, closing or opening a valve to decrease or increase fluid flow through the flow meter.

The flow meter is ideal for measuring flow rates, for example, in cooling and lubrication circuits, HVAC systems, aggressive chemical metering, and batching systems. Advantageously, the present flow meter can accommodate the use of relatively inexpensive and simple linear circuitry and eliminate the need for a microprocessor to process the signal output of the sensor to correspond to the rotation of the rotor. In addition, the flow meter includes both the sensing mechanism and the signal conditioning circuitry in a unitary device. The flow meter includes circuitry that allows the unit to be directly connected to an analog acquisition card, chart recorder, or other monitoring instrument without the need to couple the device to an external conditioning circuit. The flow meter employs a single moving component, the rotor, and is structured such that the rotor can be easily cleaned or replaced and without the need to remove the sensor element. In addition, the circuitry is hermetically encapsulated within the housing for optimum performance and increased protection and durability even within very harsh environments. Another advantage of the flow meter is that the 4–20 mA analog communication protocol provides a dynamic measuring system that does not falsely indicate a flow rate when none is present.

BRIEF DESCRIPTION OF THE DRAWINGS

Throughout the following views, reference numerals will be used in the drawings, and like reference numerals will be used throughout the several views and in the description to indicate corresponding parts of the invention.

FIG. 1 is a perspective view of a flow meter according to the invention;

FIG. 2 is an exploded view of the flow meter of FIG. 1;

FIG. 3 is a top plan view of the flow meter FIG. 1;

FIG. 3A is a perspective view of the rotor of the flow meter of the present invention.

FIG. 3B is top, elevational view of the rotor of the flow meter of the present invention.

FIG. 4 is an elevational view of the right side of the flow meter of FIG. 1;

FIG. 5 is a bottom plan view of the flow meter of FIG. 1;

FIG. 6 is an elevational cross-sectional view of the flow meter of FIG. 3 taken on line 6—6, with the rotor shown in elevational view;

FIG. 7 is an cross-sectional view of the rotor of FIG. 2 taken on line 7—7, with the center disk portion containing the magnetic members shown in cross-sectional view, FIG. 8 is a bottom plan view of the cover of FIG. 1;

FIG. 9A is a schematic diagram of an operational amplifier;

FIG. 9B is a schematic diagram of an operational amplifier; and

FIG. 10 is a schematic diagram of a system containing a flow meter of the present invention.

DETAILED DESCRIPTION OF THE INVENTION

Figure 9:
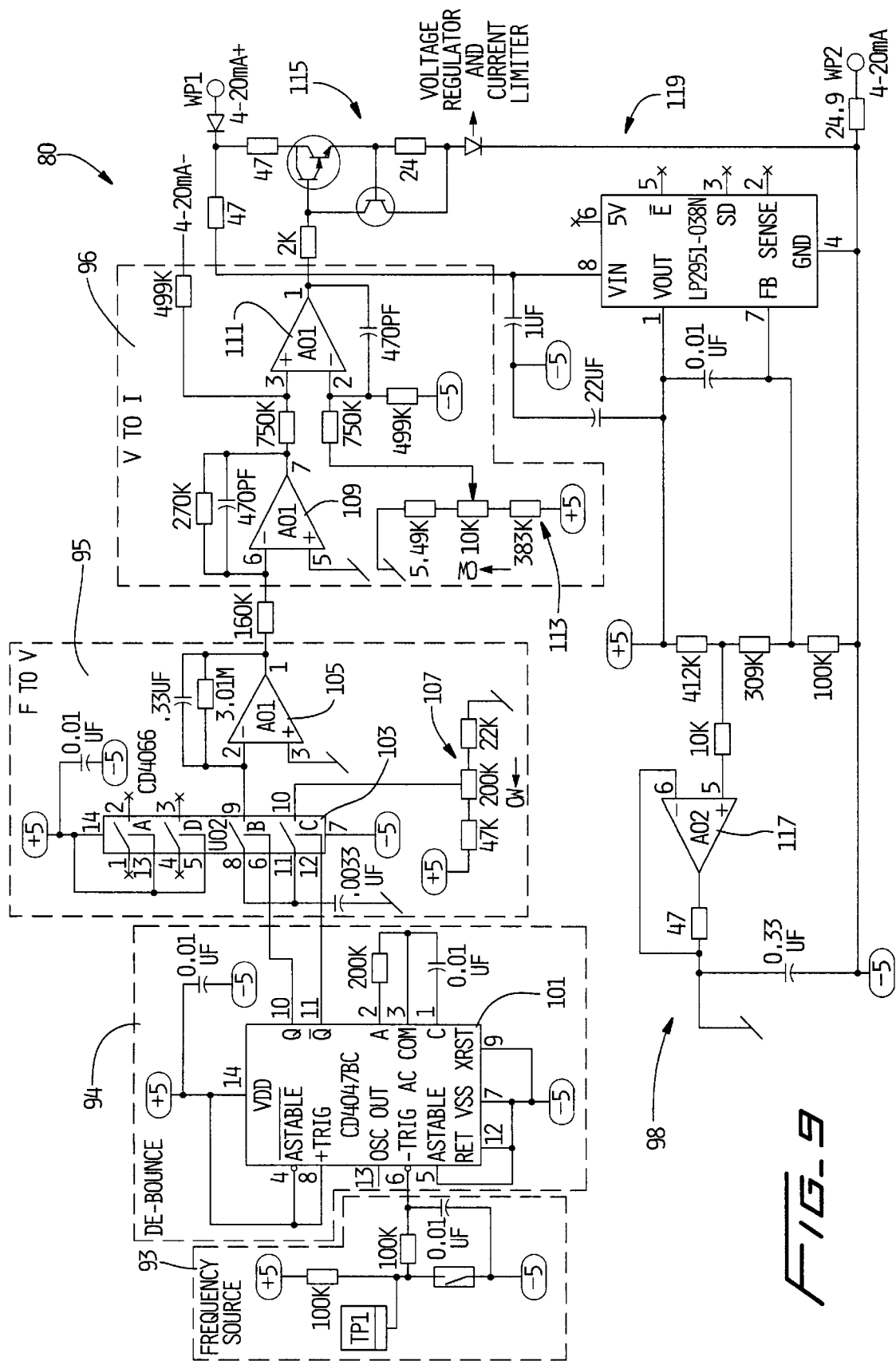
FIG. 9 is a detailed electronic schematic diagram of an embodiment of a signal-conditioning circuit of the flow meter of FIG. 1.

A liquid flow meter 10 according to the present invention is shown in FIGS. 1–6. The flow meter 10 can be a line-powered device but is preferably loop-powered by a controller that receives signals from the flow meter. As best seen in FIGS. 2 and 6, the flow meter 10 is composed of a main housing 12 that includes an outside surface 14, a base portion 15, a cylindrical first chamber 16 with an inside surface 18, a second chamber 20 with an inside surface 22, and a dividing wall 24 separating the two chambers 16 and 20. A fluid inlet opening 26 and a fluid outlet opening 28 extend through the housing 12 into the first chamber 16, thus forming a passageway 30 through the housing 12 for fluid flow therethrough. The inlet 26 and outlet 28 are adapted for coupling with a fluid flow line 32a, 32b (shown in phantom in FIG. 1). Although labeled as inlet and outlet openings, the housing 12 can accommodate a flow of fluid through the passageway 30 in the direction of the arrows 34 or in the opposite direction. Thus, the flow meter 10 is bi-directional.

The housing 12 and the components of the flow meter 10 are composed of a rigid, non-ferrous metal material such as stainless steel, an aluminum alloy, or rigid plastic. The flow meter 10 can be used to measure any fluid that is chemically compatible with the housing 12 and the components within the first chamber 16 that come in contact with the fluid including, for example, water, hydraulic fluids, petroleum products, pharmaceutical fluids, and beverages such as soda and beer.

Mounted within the cylindrical first chamber 16 is a member 36 for sensing flow of the fluid through the passageway 30 of the flow meter 10. The fluid flow sensing member 36 is composed of a rotor 38 that is rotatably mounted on an axle or shaft 40 affixed to the first surface 42 of the dividing wall 24 of the housing 12. The rotor 38 is composed of a rigid, non-reactive plastic or other non-ferrous metal material. The first chamber 16 is sized for housing the rotor 38 such that the rotor 38 can freely rotate therein.

The first chamber 16 preferably includes an opening 44 for insertion of the rotor 38 therethrough and/or for viewing the rotor 38 within the chamber 16. A cover 46 fits into the opening 44 to seal the first chamber 16 of the housing 12. The cover 46 as shown in the figures has a rim 48 with a base surface 50 and an upper surface 51, and a channel 47 for receiving an O-ring 49 therein. The cover 46 can have a variety of shapes and can be composed of a clear material such as a translucent polycarbonate plastic to permit the user to view the rotor 38 and fluid (not shown) inside the chamber 16, or a non-transparent material such as stainless steel, brass, or other non-ferrous metal.

As shown in FIG. 2 and in cross-sectional view in FIG. 6, the housing 12 at the opening 44 to the first chamber 16 is structured with an L-shaped ridge 52 and a U-shaped channel 54. The cover 46 is inserted through the opening 44, and the base surface 50 of the rim 48 is placed onto the L-shaped ridge 52 of the housing 12. A locking ring 56 is placed onto the upper surface 51 of the cover rim 48 and inserted into the U-shaped channel 54 of the housing 12. This secures the locking ring 56 in place and pressure applied by the locking ring 56 forces the base surface 50 of the rim 48 against the surface of L-shaped ridge 52. The contact between the cover 46 and the ridge 52 closes the opening 44 to the first chamber 16 of the housing. A seal is accomplished by contact of the O-ring 49 in channel 47 of the cover 46 and the inside surface 18 of the housing 12.

As best shown in FIGS. 2 and 7, the rotor 38 has a center disc portion 58 with a central bore 60 and at least two blades 62, preferably a plurality of six blades, with tip ends 64. The rotor 38 is preferably a unitary piece with the blades 62 integral with the center disc portion 58. The rotor 38 is mounted onto the shaft 40 which is inserted through the central bore 60. At least a portion of the rotor 38 is disposed within the fluid flow passageway 30, and the rotor 38 spins about the shaft 40 by contact of fluid flowing through the passageway 30 against the blades 62. The rotor 38 has an axis of rotation that is tangential to the flow of fluid through the passageway 30 depicted by the arrows 30a, 30b. Referring to FIG. 3, the rotor 38 can rotate in the direction of arrow 68 or in the opposite direction to accommodate a bi-directional flow of fluid through the passageway 30. The rotor 38 is sized to fit within the first chamber 16 such that there is a clearance space 66 between the tips 64 of the blades 62 and the inside surface 18 of the chamber 16.

The inventors have found that the size and shape of the blades 62 are important features of the invention which permit the use of relatively simple, linear circuitry (discussed below) to process the signal output of the sensor to create an output signal. Specifically, the rotor 38 is configured and dimensioned so as to create a linear relationship between the current output of the flow meter 10 and the fluid flow through the passageway 30. It has been found that the best results are achieved when a rotor having six blades is used. As best seen in FIGS. 3A and 3B, preferably, each of the blades 62 has a U-shaped arc portion 65 and the rotor 38 has a thickness (depth) 39a of about 11–12 mm. The arc portion 65 has a depth 39d of about 6–7 mm and there is a distance or a width 39e between each blade tip 64 of about 17–19 mm. Each blade has a width 39b of about 5–7 mm and a length 39c of about 8–10 mm. In general, the length 39c of each blade should be about one and a half times the width 39b.

The rotor 38 includes a signalling element 70 that functions in conjunction with a sensor element 76 to generate a signal that corresponds to the rotation of the rotor 38. Preferably, the flow meter 10 employs a signalling element 70 in the form of one or more magnetic members 70 that function with a magnetically-operated sensor 76. The flow meter 10 can also utilize an optical sensor employing an artificial light source and a photodetector (not shown). For example, the flow meter 10 can include an optical sensor that directs light from a light source to a location in the chamber through which the tips of the blades 62 pass and deflect the light to a photodetector. The circuitry described below would be modified to power and detect the light from the optical sensor. Such a system is described, for example, in U.S. Pat. No. 4,885,943 (Tootell) and U.S. Pat. No. 4,825,708 (Sevick).

Preferably, the flow meter 10 is composed of a signalling element 70 in the form of a magnetic member and a sensor element 76 that is magnetically-operated. The magnetic members 70 are preferably embedded within the body of the rotor 38 within diametrically-opposing blades 62 (not shown) or diametrically-opposed within the center disc portion 58. As best seen in FIG. 7, the center portion 58 of the rotor 38 includes two diametrically-opposed bores 72 that extend at least partially into the body of the rotor 38. Each bore 72 is sized for receiving one magnetic member 70 therein. The magnetic member 70 is composed of a material having a magnetic strength sufficiently strong to trigger a magnetically-operated sensor 76. Preferably, the magnetic member 70 is composed of neodymium, a rare-earth metal (e.g., neodymium 35). Furthermore, a filler 74 such as an epoxy, or other like material is placed into the bores 72 to encapsulate the magnetic members 70 therein.

As shown in FIG. 6, mounted in the second chamber 20 of the housing 12 is the magnetically-operated sensor 76 and a circuit board 78 which includes a signal-conditioning circuit 80 (discussed below). The housing 12 includes an opening 82 into the second chamber 20 that is sized for insertion of the circuit board 78 therethrough, and an inlet opening 84 for receiving an electric lead 86 therethrough (shown in phantom in FIG. 1). The electric lead 86 interconnects the signal-conditioning circuit 80 to an external device such as an analog processor (not shown).

The magnetically-operated sensor 76 is positioned near the second surface 88 of the dividing wall 24 such that as the rotor 38 rotates, the sensor 76 is in close proximity of each of the passing magnetic members 70. Magnetically-operated sensors are known and used in the art, and include, for example, a reed switch as shown, and a hall-effect switch. Preferably, the sensor 76 is mounted directly on the circuit board 78 supporting the signal-conditioning circuit 80. The interaction between a magnetic member 70 and the sensor 76 causes the sensor 76 to undergo a switch closure. In the embodiment shown in FIG. 7 having two magnetic members 70 in the rotor 38, the sensor 76 will undergo two switch closures for each rotation of the rotor 38. The switch closures are an indication of flow rate or fluid velocity through the passageway 30. The higher the flow rate, the faster the rotor 38 turns and the more times the magnetic member(s) 70 inside the rotor 38 pass over the sensor 76 to trigger a switch closure. The sensor 76 is electrically coupled to the signal-conditioning circuit 80, which is discussed in further detail below.

Rotation of the rotor 38 and the interaction of the signalling element 70 (e.g., magnetic members 70) with the sensor element 76 (e.g., magnetically-operated sensor 76) creates a signal that is related to fluid velocity through the passageway 30. As noted above, the rotor 38 is preferably dimensioned to accommodate the use of linear circuitry and to avoid the need and expense of a microprocessor, but it is understood that it might be possible, although not desirable, to have rotors with other shapes and dimensions utilized in conjunction with a microprocessor programmed to analyze a non-linear signal in a housing like the housing 12 in order to construct a flow meter.

In the assembly of the flow meter 10, the rotor shaft 40 is mounted in the first surface 42 of the dividing wall 24, for example, by inserting the first end 41a of the shaft 40 in a bore 90. The rotor 38 is mounted onto the shaft 40 through the central bore 60.

As illustrated in the figures, the flow meter 10 includes a cover 46 that is inserted into the opening 44 and secured in place with the locking ring 56 to seal the opening 44 to the first chamber 16. As shown in FIG. 8, optionally, but preferably, the cover 46 includes a central bore 50a in the base surface 50 that is sized to receive the second end 41b of the shaft 40 therein. The clearance space 66 is provided between the rotor 38 and the base surface 50 of the cover 46 to allow for unencumbered rotation of the rotor 38. The close proximity of the cover 46 to the rotor 38 helps to maintain the rotor 38 on the shaft 40.

When the device 10 is designed with a magnetic member 70 and magnetically-operated sensor 76, the circuit board 78 is placed within the second chamber 20 with the magnetically-operated sensor 76 (e.g., reed switch) positioned adjacent to the second surface 88 of the dividing wall 24 and so that the sensor 76 is within the magnetic field of the magnetic members 70 in the rotor 38 when the rotor rotates. Preferably, one or more spacers 91 having a predetermined height are mounted on the circuit board 78 to maintain the sensor 76 at a distance from the dividing wall 24. A potting compound or epoxy filler material 92, as for example, Epic Resin X9GC2402 (Epic Resins, Palmyra, Wis.) is poured into the second chamber 20 to encapsulate the sensor 76 and signal-conditioning circuit 80, and hermetically seal the circuit board 78 within the second chamber 20. This increases the durability of the signal-conditioning circuit, and also immobilizes the sensor 76 in a fixed position beneath the rotor 38.

As noted, the sensor 76 is electro-magnetically coupled (or, more broadly, coupled in a data communication relationship) to the signal-conditioning circuit 80 which is operable to receive the current pulse signals from the sensor 76 and convert the pulses into an output signal of about 4–20 mA that indicates the flow rate of the fluid through the passageway 30. An amplitude of about 4 mA is equivalent to an about zero flow value and an amplitude of about 20 mA is equivalent to a predetermined maximum flow value.

FIG. 9 is a circuit diagram of an embodiment of a signal-conditioning circuit for use with the flow meter 10. Preferred values for various components are shown on the drawing. The signal-conditioning circuit 80 is, in short, a frequency-to-current converter. The operation of the circuit 80 is straightforward and would be understood by those skilled in the art. However, its functional aspects are briefly described below. It is understood that, although not preferred, the flow meter 10 can utilize a microprocessor (not shown) rather than linear circuitry to process the signal output of the sensor to correspond to the rotation of the rotor.

The circuit 80 consists of four main functional components: a frequency source 93, a switch de-bounce circuit 94, a frequency-to-voltage converter 95, a voltage-to-current converter 96, and a current limiter 98. The frequency source 93 includes the sensor 76, which is preferably a reed switch. The signal produced by the frequency source 93, an on-off signal, is regulated by the de-bounce circuit 94 which includes a one-shot multivibrator 101. The output of the multivibrator 101 is coupled to the frequency-to-voltage (F-to-V) converter 95. The F-to-V converter 95 includes an analog switch 103, an operational amplifier 105, and a variable resistor or potentiometer 107. The potentiometer 107 is used to adjust the span of the circuit 80.

The output of the F-to-V converter 95 is coupled to the voltage-to-current (V-to-I) converter 96 which includes a series of operational amplifiers 109 and 111 as well as a potentiometer 113, which is used to control the offset of the circuit 80. The output of the V-to-I converter 96 is controlled by the current limiter 98 which includes a darlington transistor pair 115 and an operational amplifier 117. The circuit 80 also includes a voltage regulator 119. The output of the circuit is taken across the nodes WP1 and WP2. Although described as separate amplifiers, it should be apparent that operational amplifiers are available on integrated circuits, each containing two amplifiers.

As can be seen by reference to FIG. 10, the flow meter 10 may be incorporated into a system for measuring fluid flow in which the electric lead 86 couples the signal-conditioning circuit 80 to a processor 120 (shown schematically) that is operable to receive the analog signal for purposes of controlling a valve or for monitoring the flow fluid through the flow meter 10. Such processors are known and used in the art and include, for example, programmable logic controllers (PLCs), personal computers (PC) with an analog input card, and chart recorders. Such an analog processor can be connected to a read-out device through a communications link 123 such as a liquid crystal display device, an electronic digital display, or other visual indicator 125 (shown schematically) for displaying the rate of flow through the meter.

The analog processor is calibrated to the maximum flow value by passing a known flow through a National Institute of Standards and Technology (NIST) traceable standard in line with the flow meter 10 and then adjusting the span to 20 mA.

The analog processor can also be programmed to conduct a task when the output signal of the flow meter 10 reaches a predetermined amplitude. For example, the processor could open or close a valve, create a visual or audible signal, shut down or start up another process, or carry out similar tasks.

In use, the flow meter 10 is calibrated over a linear value range of about 4–20 mA. As noted, the flow meter 10 includes the first potentiometer 107 (SPAN control) and the second potentiometer 113 (OFFSET control) for calibrating the flow meter 10 against a standard of the fluid to be measured. To calibrate the flow meter 10, the meter is placed on a test stand (not shown) and connected to the fluid standard which is flowed therethrough. At no fluid flow (about 0 gpm), the second potentiometer 113 (OFFSET) of the flow meter 10 is adjusted to an about 4 mA amplitude reading by reading the output on an ammeter. When fluid flows through the flow meter 10 and when the NIST traceable standard indicates the desired full scale flow value, for example 10 gpm, the first potentiometer (SPAN) 107 is adjusted to read 20 mA amplitude by measuring the output with an ammeter.

As shown in FIG. 1, the flow meter 10 is coupled with the fluid line 32a, 32b carrying the fluid to be measured. The inlet line 32a that carries the fluid and the outlet line 32b that delivers the fluid to a receiving system are coupled with the fluid inlet opening 26 and the fluid outlet opening 28, respectively. Examples of receiving systems for the fluid include a drain and a mold receiving a coolant, among others. It is understood that the receiving system can be part of a closed loop set-up.

The electric lead 86 couples the signal-conditioning circuit 80 to an analog processor (not shown) that receives the flow rate signal. With the flow meter 10 calibrated to the about 4–20 mA range value, when the flow meter 10 is initially placed on-line, the initial reading shows an offset of 4 mA indicating no flow, and the mA reading will increase as the flow rate increases. Liquid entering the fluid inlet 32a flows in the direction of arrows 30a toward fluid outlet 32b and impinges against the blades 62 causing the rotor 38 to turn in the direction of the arrow 68.

The signal from the signalling element 70 to the sensor element 76 (e.g., the magnetic signals from the two magnetic members 70) trigger the sensor 76 (e.g., closure of the sensor) to generate an output signal that is electronically passed to the signal-conditioning circuit 80 which, in turn, converts the signal to an analog signal of desired characteristics. The electric lead 86 then carries the signal to the analog processor (not shown) and the signal is read. The analog processor can be programmed such that when a signal having a predetermined amplitude is received, the processor would perform an activity such as opening or closing a value to alter the fluid flow through the flow meter 10, or other activity such as starting up or shutting down an additional process.

Although the invention has been described by reference to detailed examples and methodologies. These examples are not meant to limit the scope of the invention. It should be understood that variations and modifications may be made while remaining within the spirit and scope of the invention, and the invention is not to be construed as limited to the specific embodiments shown in the drawings. The disclosures of the cited references are incorporated by reference herein.

What is claimed is:

1. A flow meter for measuring rate of flow of a fluid, comprising:

(a) a single unit housing having a first chamber and a separate second chamber with a dividing wall separating the chambers, the first chamber having an inlet and an outlet for fluid flow through a passageway extending therethrough;

(b) a fluid flow sensing member mounted within the first chamber and at least partially disposed within the fluid flow passageway, comprising a rotor rotatably mounted on a shaft having an axis that is tangential to the fluid flow; the rotor having at least two blades each having a tip portion, and a signalling element in the form of a magnetic member mounted within the rotor; the rotor being rotatable by contact of fluid flowing through the passageway;

c) a magnetically-operated sensor mounted within the second chamber in proximity to the signalling element in the rotor such that for each rotation of the rotor, the signalling element causes the sensor to produce a first signal; and (d) a signal-conditioning circuit housed within the second chamber and including linear circuitry operable to receive the first signal from the sensor and convert the first signal into a second 4–20 mA output signal that indicates the flow rate of the fluid through the passageway such that an amplitude of about 4 mA is equivalent to an about zero flow value and an amplitude of about 20 mA is equivalent to a predetermined maximum flow value;

the rotor being configured and dimensioned to continuously rotate during fluid flow through the flow meter and provide a linear relationship between the rate of fluid flow through the meter and the output signal, the rotor having a depth of about 11–12 mm, and each blade having a width of about 5–7 mm and a length of about 8–10 mm, with the length being about 1½ times the width; and the circuitry being operable to allow direct connection of the flow meter to an analog processor without connection to an external conditioning circuit.

2. The flow meter according to claim 1, wherein the signalling element will undergo at least one switch closure for each rotation of the rotor to produce the first signal.

3. The flow meter according to claim 1, wherein the rotor comprises six blades with a distance between adjoining blade tip portions of about 17–19 mm, and two magnetic members mounted within two diametrically-opposed bores in a central disc portion or within two blades of the rotor, and the sensor will undergo two switch closures to produce the first signal.

4. The flow meter according to claim 1, wherein the rotor is a unitary piece with the blades integral with a central disc portion.

5. The flow meter according to claim 1, wherein the magnetic member is embedded within a central disc portion of the rotor.

6. The flow meter according to claim 1, wherein the flow meter is loop-powered.

7. The flow meter according to claim 1, wherein the first chamber further comprises an opening into the chamber for viewing the rotor, and a cover sized for sealing the chamber opening.

8. The flow meter according to claim 7, wherein in the cover is transparent.

9. A fluid flow measuring system, comprising:

the flow meter according to claim 1, the signal conditioning circuit being coupled in direct data communication with an analog processor calibrated to a no flow value and to a full flow value, without connection to an external conditioning circuit.

10. The system according to claim 9, wherein the analog processor is programmed to conduct a task when the second signal reaches a predetermined amplitude.

11. The system according to claim 9, further comprising a read-out device coupled in data communication with the analog processor.

12. A flow meter for measuring rate of flow of a fluid, comprising:

(a) a single unit housing having a first chamber and a separate second chamber separated by a dividing wall therebetween, the first chamber having an inlet and an outlet for fluid flow through a passageway extending therethrough;

(b) a rotor mounted within the first chamber and at least partially disposed within the fluid flow passageway; the rotor being a unitary piece with six blades integral with a central disc portion and rotatably mounted on a shaft having an axis that is tangential to the fluid flow, and containing a magnetic signalling element mounted within a central disc portion or within two blades of the rotor; the rotor being rotatable by contact of fluid flowing through the passageway;

(c) a magnetically-operated sensor mounted within the second chamber in proximity to the signalling element in the rotor such that for each rotation of the rotor, the signalling element causes the sensor to produce a first signal; and (d) a signal-conditioning circuit encapsulated within the second chamber and including linear circuitry operable to receive the first signal from the sensor and to convert the first signal into a second 4–20 mA output signal that indicates the flow rate of the fluid through the passageway such that an amplitude of about 4 mA is equivalent to an about zero flow value and an amplitude of about 20 mA is equivalent to a predetermined maximum flow value;

the rotor having a depth of about 11–12 mm, and each blade having a width of about 5–7 mm and a length of about 8–10 mm, with the length being about 1½ times the width, a U-shaped arc portion inbetween adjacent blades of about 6–7 mm, and a tip portion with adjoining blade tips having a distance thereinbetween of about 17–19 mm, the dimensions and configuration of the rotor effective to achieve a continuous rotation of the rotor during fluid flow through the flow meter and a speed of rotation of the rotor to provide a linear relationship between the rate of the fluid flow through the meter and the output signal; and the circuitry being operable to allow direct connection of the flow meter to an analog processor without connection to an external conditioning circuit.

13. The flow meter according to claim 12, wherein the signalling element will undergo at least one switch closure for each rotation of the rotor to produce the first signal.

14. The flow meter according to claim 13, wherein the signaling element has two magnetic members mounted within two diametrically-opposed bores in the central disc portion or within two blades of the rotor, and will undergo two switch closures for each rotation of the rotor to produce the first signal.

15. The flow meter according to claim 12, wherein the first chamber further comprises an opening into the chamber for viewing the rotor, and a cover sized for sealing the chamber opening.

16. The flow meter according to claim 15, wherein the cover is transparent.

17. A flow meter for measuring rate of flow of a fluid, having a first chamber with an inlet and an outlet for fluid flow through a passageway extending therethrough; a rotor rotatably mounted on a shaft within the passageway of the first chamber and rotatable by contact of fluid flowing through the passageway, the shaft having an axis that is tangential to the fluid flow, and the rotor having blades and a magnetic signalling element mounted within the rotor; and a magnetically-operated sensor mounted in proximity to the magnetic signalling element in the rotor such that for each rotation of the rotor, the signalling element causes the sensor to produce a first signal;

the improvement characterized by:

a) the rotor, a sensing element and a signal-conditioning circuit being housed together in a single unit housing including the first chamber and a second chamber, the two chambers separated by a dividing wall, the rotor being contained within the first chamber, and the sensing element and the signal-conditioning circuit being contained within the second chamber;

b) the signal-conditioning circuit including linear circuitry operable to receive the first signal from the sensor and convert the first signal into a second output signal that indicates the flow rate of the fluid through the passageway;

c) the output signal being a 4–20 mA signal such that an amplitude of about 4 mA is equivalent to an about zero flow value and an amplitude of about 20 mA is equivalent to a predetermined maximum flow value;

d) the rotor being configured and dimensioned to continuously rotate during fluid flow through the flow meter and to achieve a speed of rotation during fluid flow to provide a linear relationship between the rate of the fluid flow through the flow meter and the output signal; and e) the circuitry being operable to allow direct connection of the flow meter in data communication to a processing device without connection to an external conditioning circuitry.

18. The flow meter according to claim 17, wherein the rotor has a depth of about 11–12 mm, and each blade has a tip, a width of about 5–7 mm and a length of about 8–10 mm, with the length being about 1½ times the width.

19. The flow meter according to claim 18, wherein the rotor comprises six blades with a distance between adjoining blade tips of about 17–19 mm.

20. The flow meter according to claim 17, wherein the rotor comprises two magnetic members mounted within two diametrically-opposed bores in a central disc portion or within two blades of the rotor, and the sensor will undergo two switch closures to produce the first signal.

21. The flow meter according to claim 17, wherein the processing device is programmed to conduct a task when the output signal reaches a predetermined amplitude.

22. The flow meter according to claim 17, further comprising a read-out device coupled in data communication with the processing device.

23. A flow meter for measuring rate of flow of a fluid, having a chamber with an inlet and an outlet for fluid flow through a passageway extending therethrough; a rotor rotatably mounted on a shaft within the passageway of the first chamber and rotatable by contact of fluid flowing through the passageway, the shaft having an axis that is tangential to the fluid flow, and the rotor having blades and a magnetic signalling element mounted within the rotor; and a magnetically-operated sensor mounted in proximity to the magnetic signalling element in the rotor such that for each rotation of the rotor, the signalling element causes the sensor to produce a first signal;

the improvement characterized by:

a) the rotor, a sensing element and a signal-conditioning circuit being housed together in a single unit housing including the first chamber and a second chamber, the two chambers separated by a dividing wall, the rotor being contained within the first chamber, and the sensing element and the signal-conditioning circuit being contained within the second chamber;

b) the signal-conditioning circuit including linear circuitry operable to receive the first signal from the sensor and convert the first signal into a second output signal that indicates the flow rate of the fluid through the passageway;

c) the output signal being a 4–20 mA signal such that an amplitude of about 4 mA is equivalent to an about zero flow value and an amplitude of about 20 mA is equivalent to a predetermined maximum flow value;

d) the rotor being configured and dimensioned to continuously rotate during fluid flow through the flow meter and to achieve a speed of rotation during fluid flow to provide a linear relationship between the rate of the fluid flow through the flow meter and the output signal; the rotor having a depth of about 11–12 mm and six blades with a distance between adjoining blade tips of about 17–19 mm with each blade having a tip, a width of about 5–7 mm and a length of about 8–10 mm, with the length being about 1½ times the width; and e) the circuitry being operable to allow direct connection of the flow meter in data communication to a processing device without connection to an external conditioning circuitry.

* * * * *